US009535740B1

(12) United States Patent
Graham et al.

(10) Patent No.: US 9,535,740 B1
(45) Date of Patent: Jan. 3, 2017

(54) IMPLEMENTING DYNAMIC ADJUSTMENT OF RESOURCES ALLOCATED TO SRIOV REMOTE DIRECT MEMORY ACCESS ADAPTER (RDMA) VIRTUAL FUNCTIONS BASED ON USAGE PATTERNS

(71) Applicant: International Business Machines Corporation, Armonk, NY (US)

(72) Inventors: Charles S. Graham, Rochester, MN (US); Prathima Kommineni, Hyderabad (IN); Timothy J. Schimke, Stewartville, MN (US); Narsimha R. Challa, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/836,309

(22) Filed: Aug. 26, 2015

(51) Int. Cl.
*G06F 9/455* (2006.01)
*G06F 9/50* (2006.01)

(52) U.S. Cl.
CPC ......... *G06F 9/45558* (2013.01); *G06F 9/5077* (2013.01); *G06F 2009/45583* (2013.01)

(58) Field of Classification Search
None
See application file for complete search history.

(56) References Cited

U.S. PATENT DOCUMENTS

| 5,850,395 | A | * | 12/1998 | Hauser | G06F 15/17375 370/398 |
| 5,862,485 | A | * | 1/1999 | Linneweh, Jr. | H04W 72/10 455/450 |
| 8,621,481 | B2 | | 12/2013 | Fu et al. | |
| 8,862,739 | B2 | | 10/2014 | Brownlow et al. | |
| 2007/0124274 | A1 | * | 5/2007 | Barsness | G06F 17/30312 |
| 2009/0133028 | A1 | * | 5/2009 | Brown | G06F 13/385 718/104 |
| 2011/0225277 | A1 | * | 9/2011 | Freimuth | G06F 9/45558 709/223 |
| 2014/0137110 | A1 | * | 5/2014 | Engle | G06F 9/5022 718/1 |
| 2014/0245300 | A1 | | 8/2014 | Clegg et al. | |
| 2015/0078352 | A1 | * | 3/2015 | Rong | H04J 3/16 370/336 |

* cited by examiner

*Primary Examiner* — Emerson Puente
*Assistant Examiner* — Jonathan R Labud
(74) *Attorney, Agent, or Firm* — Joan Pennington

(57) ABSTRACT

A method, system and computer program product are provided for implementing dynamic adjustment of resources allocated to Single Root Input/Output Virtualization (SRIOV) Remote Direct Memory Access (RMDA) virtual functions (VFs) in Cloud Software Defined Server environments. A hardware management console (HMC), and a hypervisor are used to implement resource allocation to the SRIOV RDMA VFs based on resource usage. The hypervisor checks resource usage for the resource allocations of the SRIOV RDMA VF relative to lower and upper threshold values. Responsive to identifying the resource usage below the lower threshold or above the upper threshold, the hypervisor sends an event to the HMC, and the HMC starts a resource redistribution process.

20 Claims, 8 Drawing Sheets

700

| 1 | 1 | 0 | 0 | 0 | 1 | 1 | 0 |
|---|---|---|---|---|---|---|---|
| 1 | 0 | 1 | 1 | 1 | 1 | 0 | 0 |
| 1 | 0 | 0 | 0 | 1 | 1 | 0 | 0 |
| 1 | 1 | 1 | 1 | 0 | 1 | 1 | 1 |
| 0 | 0 | 0 | 1 | 1 | 0 | 0 | 0 |
| 0 | 1 | 1 | 0 | 1 | 1 | 0 | 0 |

FIG. 7

IMPLEMENTING DYNAMIC ADJUSTMENT OF RESOURCES ALLOCATED TO SRIOV REMOTE DIRECT MEMORY ACCESS ADAPTER (RDMA) VIRTUAL FUNCTIONS BASED ON USAGE PATTERNS

FIELD OF THE INVENTION

The present invention relates generally to the data processing field, and more particularly, relates to a method, system and computer program product for implementing dynamic adjustment of resources allocated to Single Root Input/Output Virtualization (SRIOV) Remote Direct Memory Access (RMDA) virtual functions (VFs) based upon usage patterns in Cloud Software Defined Server environments.

DESCRIPTION OF THE RELATED ART

Single root input/output (IO) virtualization (SRIOV) is a PCI standard, providing an adapter technology building block for I/O virtualization within the PCI-Express (PCIe) industry. SRIOV capability is a feature of many new PCIe adapters for Fibre Channel, Ethernet, Infiniband, and Converged Network Adapters (CNA).

In cloud data centers utilization of resources is important. One critical resource in today's cloud data centers is Remote Direct Memory Access (RMDA) enabled network adapters. 10 GB Ethernet is becoming available in the cloud environment and the adoption of RDMA infrastructure is growing for network acceleration for big data and analytics where large amounts of data needs to be processed, which requires a fast response time.

Cloud providers typically provide varying service level agreements (SLAs) at different price points to target different customer segments. For example, a customer requiring 99.9% availability of five CPU cores may pay a premium price in comparison with a customer requiring lesser availability of the same number of cores. One approach used for some resources is to over commit usage with the assumption that not all customers will concurrently be using their maximum allocation.

In general, hypervisors allocate resources to Virtual Functions (VFs) based on a Quality of Service (QoS) value given by Administrators at the VF creation time. However, this static allocation of resources to VFs fails to provide optimum utilization levels. Much of the time a partition is functioning below their maximum resource levels and expensive hardware resources remain idle. Typically adapter resources are statically assigned, and do not automatically adjust.

A need exists for an effective mechanism to implement dynamically adjustment of resources allocated to Single Root Input/Output Virtualization (SRIOV) Remote Direct Memory Access (RMDA) virtual functions (VFs) based upon usage patterns in Cloud Software Defined Server environments. An improvement in Cloud Software Defined Server environments is desired to enable better utilization of software and hardware resources.

SUMMARY OF THE INVENTION

Principal aspects of the present invention are to provide a method, system and computer program product for implementing dynamic adjustment of resources allocated to Single Root Input/Output Virtualization (SRIOV) Remote Direct Memory Access (RMDA) virtual functions (VFs) based upon resource usage patterns in Cloud Software Defined Server environments. Other important aspects of the present invention are to provide such method, system and computer program product substantially without negative effects and that overcome many of the disadvantages of prior art arrangements.

In brief, a method, system and computer program product are provided for implementing dynamic adjustment of resources allocated to Single Root Input/Output Virtualization (SRIOV) Remote Direct Memory Access (RMDA) virtual functions (VFs) in Cloud Software Defined Server environments. A hardware management console (HMC), and a hypervisor are used to implement resource allocation to the SRIOV RDMA VFs based on resource usage. The hypervisor checks resource usage for the resource allocations of the SRIOV RDMA VF relative to lower and upper threshold values. Responsive to identifying the resource usage below the lower threshold or above the upper threshold, the hypervisor sends an event to the HMC, and the HMC starts a resource redistribution process.

In accordance with features of the invention, the hypervisor manages the resources and adjusts the resource levels for the RDMA Virtual Functions (VFs) according to the desired resource level and current service level agreement. Each resource has a minimum guaranteed level, a maximum level, and a threshold value. The resources are dynamically adjusted based upon the current usage. This allows for higher utilization of the resources because not all VFs are assigned their maximum resource levels concurrently.

In accordance with features of the invention, the HMC optionally identifies the number of resources used by a particular VF by using one statistics field for that VF that can be queried from the hypervisor by the HMC.

In accordance with features of the invention, the HMC optionally queries statistics for each VF on a periodic basis or receives from the hypervisor events related to resources usage for each VF based on threshold comparisons.

In accordance with features of the invention, the HMC allocates additional resources from free resources to a particular VF that requires more resources or deallocates excess resources from a VF and returns the deallocated excess resources to a free resource pool if the number of resources used by particular VF is significantly lower than the threshold.

In accordance with features of the invention, the hypervisor maintains usage of resources by a Virtual Function, for example, using a Bitmap tracking resource usage. When the number of bits set in the Bitmap reaches the threshold, additional resources are allocated for the particular VF based on the priority of the virtual machine of that VF.

BRIEF DESCRIPTION OF THE DRAWINGS

The present invention together with the above and other objects and advantages may best be understood from the following detailed description of the preferred embodiments of the invention illustrated in the drawings, wherein.

Figure 8:
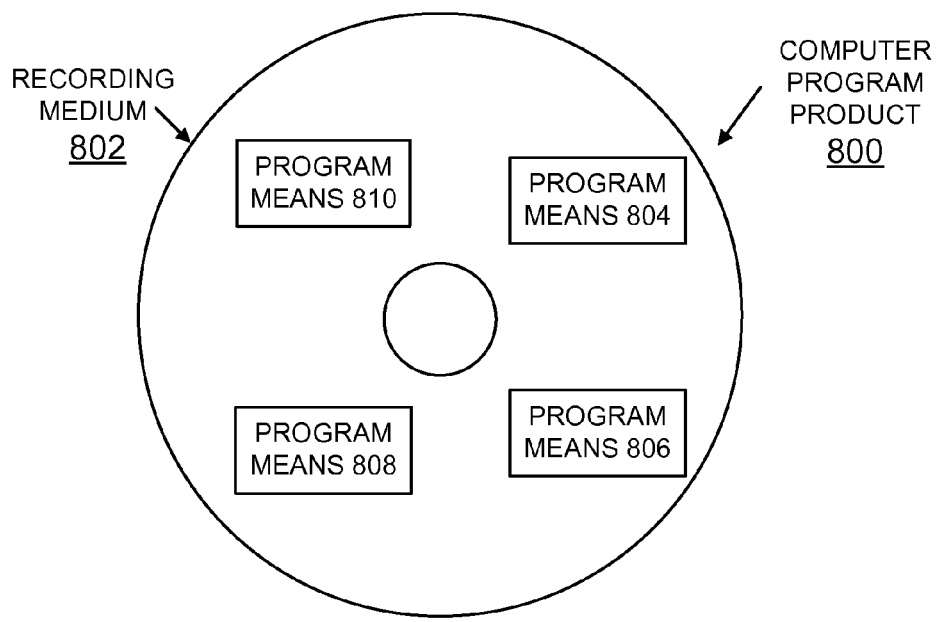

virtual functions (VFs) in Cloud Software Defined Server environments in accordance with the preferred embodiment;

FIG. 7 is a diagram illustrating an example bitmap used for tracking resource usage in accordance with the preferred embodiment; and FIG. 8 is a block diagram illustrating a computer program product in accordance with the preferred embodiment.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing dynamic adjustment of resources allocated to Single Root Input/Output Virtualization (SRIOV) Remote Direct Memory Access (RMDA) virtual functions (VFs) in Cloud Software Defined Server environments in accordance with the preferred embodiment.

Figure 1:
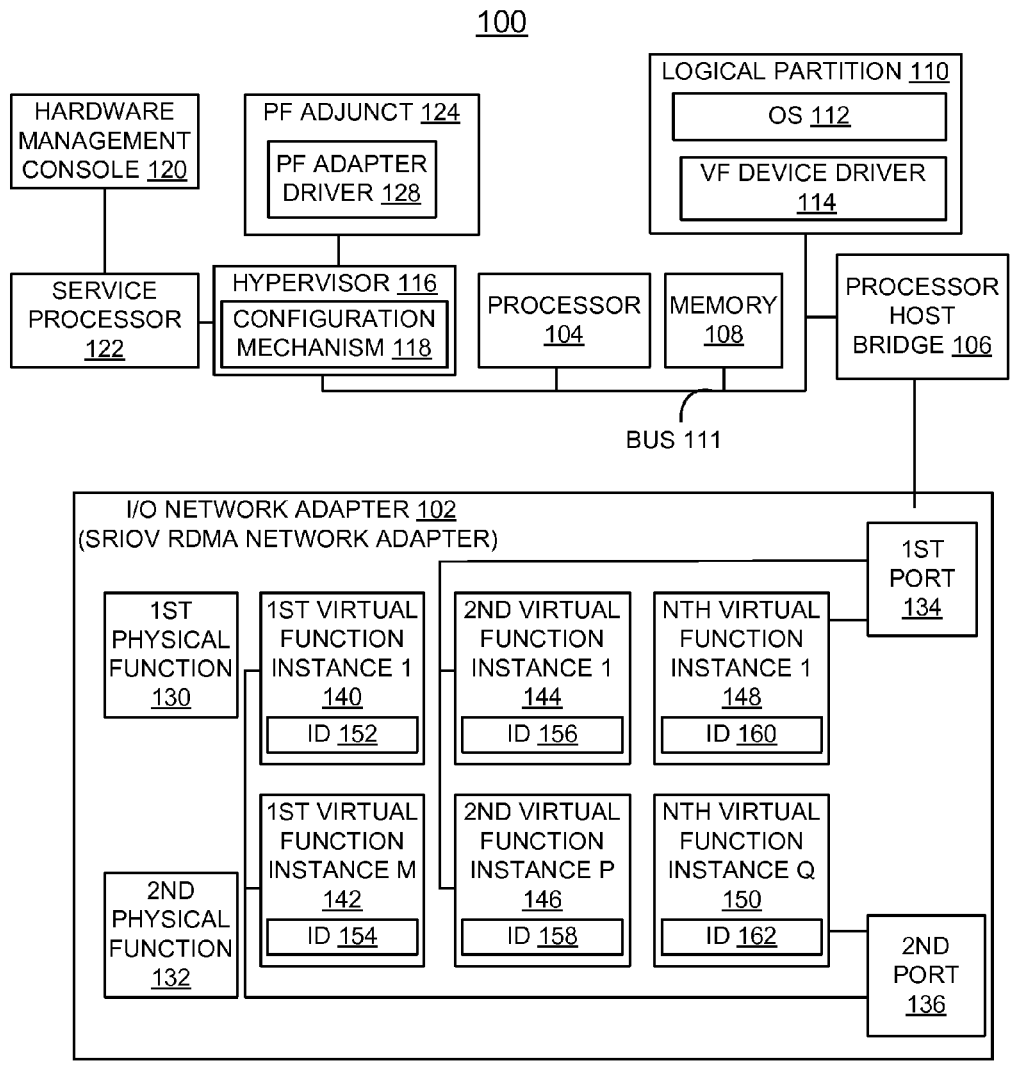
FIG. 1 illustrates a example computer system for implementing dynamic adjustment of resources allocated to Single Root Input/Output Virtualization (SRIOV) Remote Direct Memory Access (RMDA) virtual functions (VFs) in Cloud Software Defined Server environments in accordance with the preferred embodiment.

Having reference now to the drawings, in FIG. 1, there is shown an example computer system in Cloud Software Defined Server environments generally designated by the reference character 100 for implementing dynamic adjustment of resources allocated to Single Root Input/Output Virtualization (SRIOV) Remote Direct Memory Access (RMDA) virtual functions (VFs) in an I/O network adapter 102 or SRIOV RMDA network adapter 102 in accordance with the preferred embodiment. Computer system 100 includes one or more processors 104, or central processor units (CPUs) 104 (one shown) coupled by an I/O hub or processor host bridge 106 to the Single Root Input/Output Virtualization (SRIOV) RDMA adapter 102.

Computer system 100 includes a memory 108 and one or more logical partitions (LPARs) 110 (one shown) coupled by a system bus 111 to the processor 104 and the processor host bridge 106. Each operating system (OS) 112 resides in its own LPAR 110, with each LPAR allocated a part of a physical processor 104, an entire physical processor, or multiple physical processors from the computer system 100. A VF device driver 114 is provided with the logical partition (LPAR) 110. A portion of the memory 108 is allocated to each LPAR 110. Computer system 100 includes a hypervisor 116 including a configuration mechanism 118. The hypervisor 116 is a part of the system firmware, which manages the allocation of resources to each operating system 112 and LPAR 110.

As shown, a hardware management console (HMC) 120 used for implementing dynamic resource allocation adjustment, and for example, to manage system functions including logical partition configuration, is coupled to the hypervisor 116 via a service processor 122. Computer system 100 includes a physical function (PF) manager or PF adjunct 124 provided with the hypervisor 116. The PF adjunct 124 includes an adapter driver 128 to manage physical functions of the hardware I/O adapter 102. The hypervisor 116 uses the PF adjunct 124, for example, to configure physical functions (PFs) and virtual functions (VFs) of the hardware I/O adapter 102, for example, based on configuration information provided by a system administrator via the hardware management console 120, and for implementing dynamic resource allocation adjustment in accordance with the invention.

In accordance with features of the invention, the hardware management console (HMC) 120, and a hypervisor 116 are used to implement resource allocation to the SRIOV RDMA VFs based on resource usage.

As shown, the hardware I/O adapter 102 includes, for example, a first physical function 130, a second physical function 132, a first port 134, and a second port 136. The hypervisor 116 using the PF adjunct 124 configures virtual functions (VFs) based on the physical functions 130, 132 and associates virtual functions with one or more of the ports 134, 136 of the hardware I/O adapter 102.

For example, a first virtual function, 140, instance 1, and the Mth instance of the first virtual function 142, where M is greater than 1, are associated with the second port 136. As shown, a second virtual function 144, such as the first instance of the second virtual function 144 and the Pth instance of the second virtual function 146, where P is greater than 1, are associated with the first port 134. As shown, multiple instances of an Nth virtual function, where N is greater than 2, such as the first instance of the Nth virtual function 148 is associated with the first port 134 and the Qth instance of the Nth virtual function 150, where Q is greater than 1, is associated with the second port 136.

Each instance of the first virtual function 140, 142, the second virtual function 144, 146, and Nth virtual function 148, 150 are hosted by a physical function, such as one of the first physical function 132, the second physical function 132, and another physical function (not shown).

Each instance of the first virtual function 140, 142, the second virtual function 144, 146, and Nth virtual function 148, 150 includes a respective virtual function identifier (ID), shown as ID 152, ID 154, ID 156, ID 158, ID 160, and ID 162. Each virtual function identifier uniquely identifies a particular virtual function that is hosted by the hardware I/O adapter 102. For example, when a message (not shown) is routed to a particular virtual function, the message includes the identifier associated with the particular virtual function.

System 100 is shown in simplified form sufficient for understanding the present invention. The illustrated system 100 is not intended to imply architectural or functional limitations. The present invention can be used with various hardware implementations and systems and various other internal hardware devices.

In accordance with features of the invention, the hypervisor 116 manages the resources and adjusts the resource levels for the RDMA Virtual Functions (VFs) according to the desired resource level and current service level agreement. Each resource has a minimum guaranteed level, a maximum level, and a threshold value. The resources are dynamically adjusted based upon the current usage. This allows for higher utilization of the resources because not all VFs are assigned their maximum resource levels concurrently. The resources are given to the VFs with the highest priority to maximize the number of virtual machines which satisfy the service level agreement.

In accordance with features of the invention, the setting of the minimum guaranteed level can be different for different VFs. This allows for customization based upon expected use, and to handle the case where a certain amount of resources is required below which the virtual machine does not work for its intended allocation. This also is used to help satisfy the service level agreement, where virtual machines with higher service levels might be given higher guaranteed values. Cloud providers can more efficiently utilize the available hardware resources, gain the ability to dynamically adjust resource levels when using adapters supporting static allocation schemes, and extend the benefits of over committing resources to virtualized RDMA adapters.

Referring to FIGS. 2, 3, 4, 5 and 6, there are shown example operations of the hypervisor 116 and HMC 120 for implementing dynamic adjustment of resources allocated to Single Root Input/Output Virtualization (SRIOV) Remote Direct Memory Access (RMDA) virtual functions (VFs) in Cloud Software Defined Server environments in accordance with the preferred embodiment.

In accordance with features of the invention, the usage of resources for a SRIOV VF is monitored based on thresholds. Each SRIOV RDMA VF is assigned a certain number of resources during its creation. During operation, the SRIOV RDMA VF may require more or less than the initial configured value and can be dynamically adjusted with the present invention.

Figure 2:
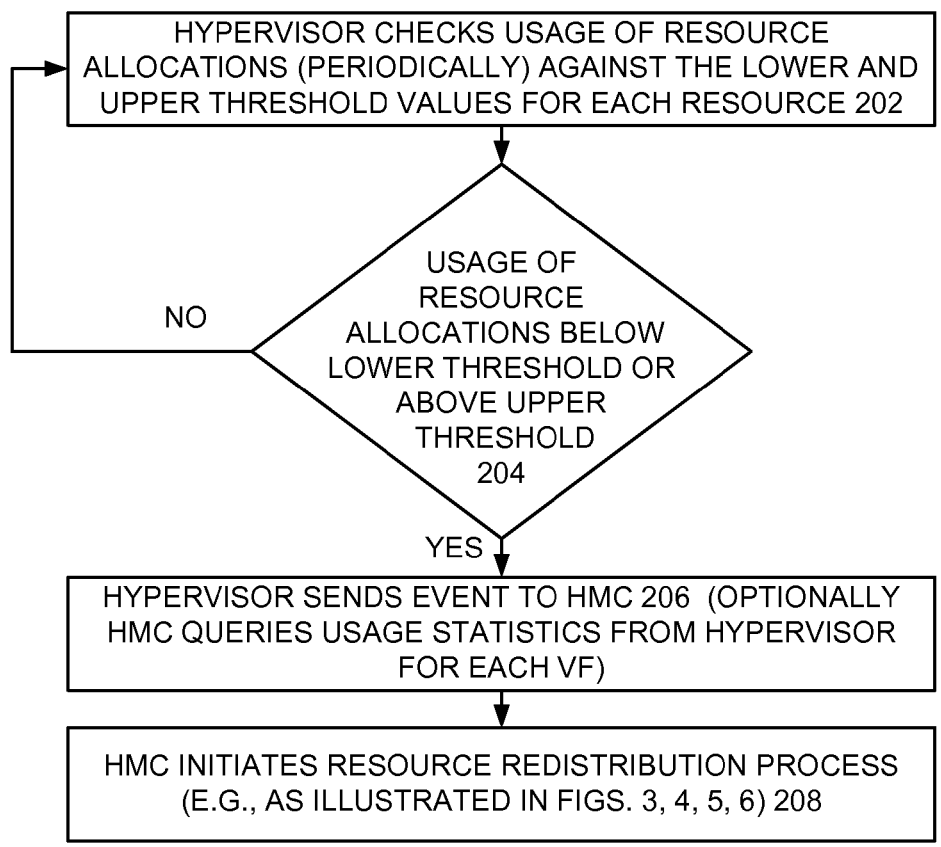
FIGS. 2, 3, 4, 5, and 6 are flow charts illustrating example operations for implementing dynamic adjustment of resources allocated to Single Root Input/Output Virtualization (SRIOV) Remote Direct Memory Access (RMDA)

Referring now to FIG. 2, there are shown example steps generally designated by the reference character 200 for monitoring usage of resources for a SRIOV RMDA VF based on threshold. As indicated in a block 202, the hypervisor checks usage of resource allocations (periodically) against the lower and upper threshold values for each resource. As indicated in a decision block 204, it is determined if usage of resource allocations is below a lower threshold or above an upper threshold. When the usage of resource allocations is below a lower threshold or above an upper threshold, then the hypervisor sends an event to the HMC as indicated in a block 206. Also the HMC optionally queries usage statistics from the hypervisor for each VF on a periodic basis at block 206. Responsive to the receiving the event as indicated in a block 208, the HMC initiates a resource redistribution process, for example, as illustrated in example operations of FIGS. 3, 4, 5, and 6.

In accordance with features of the invention, the hypervisor maintains the usage of resources by a Virtual Function. Basically, resource usage can be tracked by the hypervisor using a Bitmap. When the number of bits set in the Bitmap reaches the threshold, the hypervisor allocates additional resources for that VF based on the priority of the virtual matching (VM) owning the VF.

In accordance with features of the invention, the hypervisor maintains the usage of resources using resource pools, for example, including an adapter allocated used resource pool of resources allocated and actively being used by Virtual Functions of active/running VMs for a given adapter. The hypervisor maintains an adapter allocated unused resource pool of resources allocated but unused, such as a corresponding VM and hence all of its VFs are in inactive state, for a given adapter. For example, for each VF, a Bitmap is maintained whose capacity is equal to the number of resources allocated to that VF. For example, for each VF, if a particular bit is set in the bitmap, then the resource corresponding to that Bit is used or otherwise unused. The hypervisor maintains an adapter unallocated resource pool of resources of unallocated, or free resources for an adapter that pooled by the hypervisor. The allocated or unallocated resources can be tracked by adapter using a Bitmap whose capacity is equal to the total number of resources available. For example, for each VF, if a particular bit is set, then the resource corresponding to that Bit is allocated or is otherwise unallocated.

Figure 3:
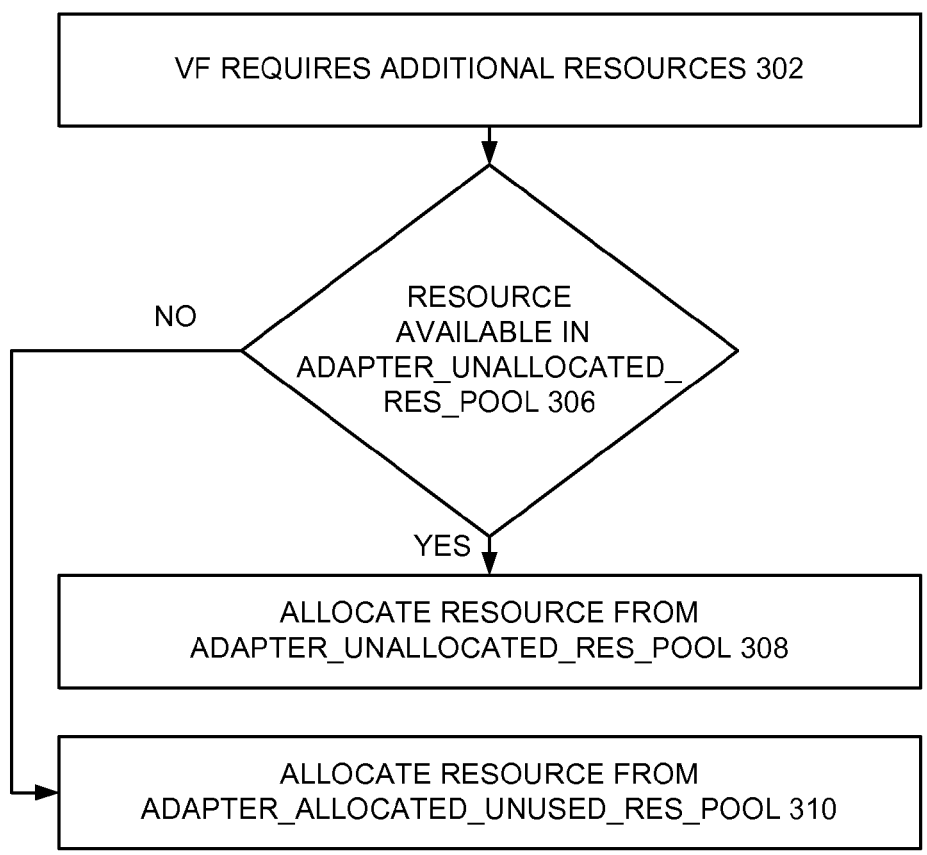

Referring now to FIG. 3, there are shown example steps generally designated by the reference character 300 for adjusting resource allocations for a SRIOV RMDA VF. As indicated in a block 302, the VF requires additional resources. When one or more VFs need additional resources, then based on their relative priorities additional resources will be allocated from the adapter unallocated resource pool. If the adapter unallocated resource pool is empty, then any additional allocations will be done from the adapter allocated unused resource pool. Both the pools are continuously updated with resources dynamically due to either addition/deletion of VFs, allocation and deallocation of resources.

Checking for resource being available in the adapter unallocated resource pool is performed as indicated in a decision block 306. Responsive to resource being available in the adapter unallocated resource pool, resources are allocated from the adapter unallocated resource pool as indicated in a block 308. Responsive to resources not being available in the adapter unallocated resource pool, available resources are allocated from the adapter allocated unused resource pool as indicated in a block 310.

Figure 4:
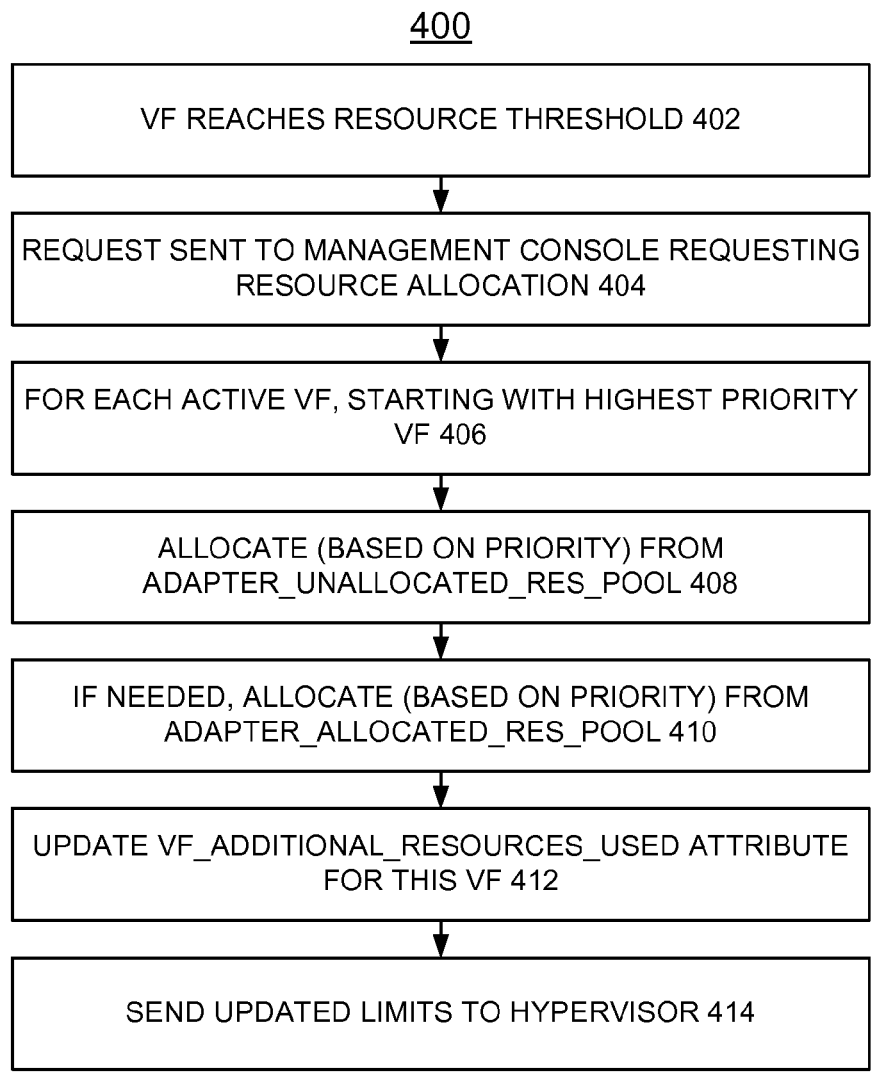

Referring now to FIG. 4, there are shown example steps generally designated by the reference character 400 for adjusting resource allocations for a SRIOV RMDA VF. As indicated in a block 402, a particular VF reaches a resource threshold. As indicated in a block 404, a request is sent to the HMC requesting resource reallocation. As indicated in a block 406 for each active VF, starting with the highest priority VF adjusting resource allocations is performed. As indicated in a block 408, allocate based on priority from the adapter unallocated resource pool. If needed, for example if the adapter unallocated resource pool is empty, then any additional allocations are done from the adapter allocated unused resource pool as indicated in a block 410. As indicated in a block 412, VF additional resources used attribute are updated for this VF. As indicated in a block 414, updated limits are sent to the hypervisor.

Figure 5:
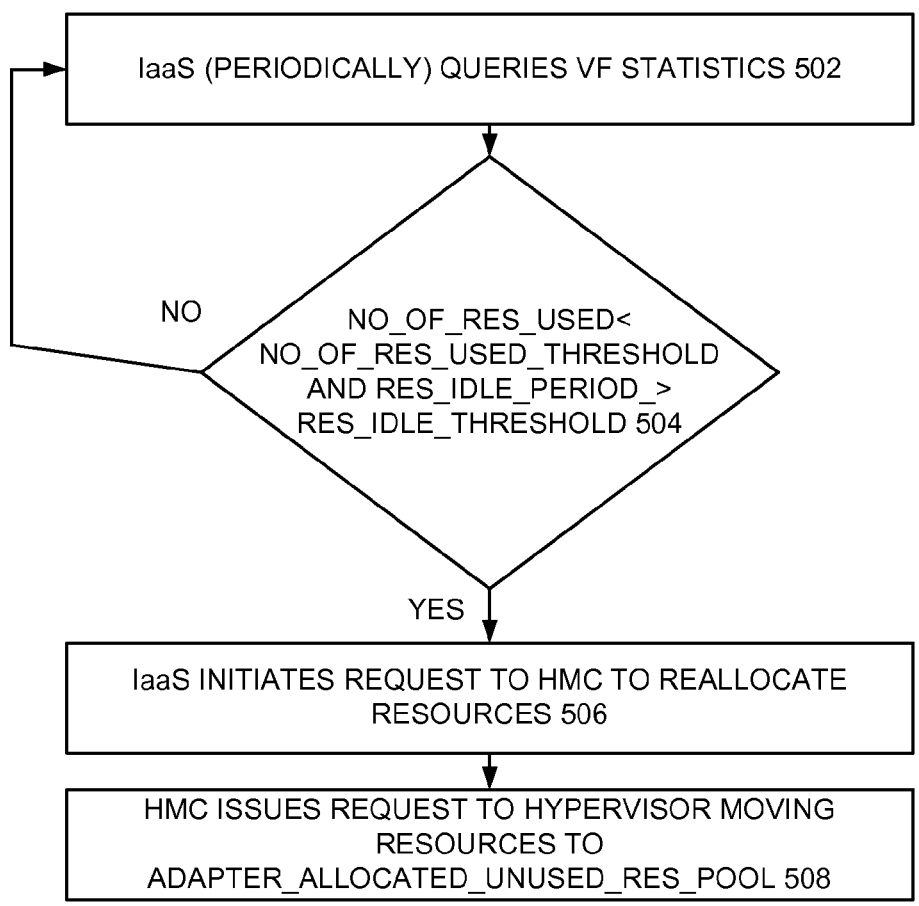

In accordance with features of the invention, an intelligent provisioning layer, for example, called IaaS in a PowerVC, SoftLayer, monitors the events from hypervisors. The IaaS software is enhanced to handle events related to RDMA Resources also. When the usage of resources for a VF reaches the threshold value for that VF, then the HMC receives such events from hypervisors. Cloud IaaS application optionally subscribes to these events from one or more hypervisors. The cloud IaaS work flow engine can take into consideration of VM Priority (from customer SLAs) and invoke a work flow to allocate additional resources to the corresponding VFs, such as shown in FIG. 5. The IaaS layer sends a request to the HMC to allocate additional Resources to the VF belonging to a VM whose resource usage reached threshold. The advantage of this approach is that additional resources can be shared if a specific port has high utilization while another port has low utilization at a given time.

Referring now to FIG. 5, there are shown example steps generally designated by the reference character 500 for monitoring usage of resources and adjusting resource allocations for a SRIOV RMDA VF. As indicated in a block 502, the cloud IaaS periodically queries VF statistics. A number of resources used is compared with a number of resources used threshold and a resource idle period is compared with a resource idle threshold as indicated in a decision block 504. The idle period for a resource is defined as the amount of time for which there is no activity. If the idle period for a resource exceeds a specified (configurable) period of time, then it is declared as an idle resource. For each resource belonging to a VF, a data structure is maintained which keeps track of idle period. For example, the number of idle resources, and number of used resources, are reported as fields in VF Statistics. The IaaS layer queries the VF statistics from the HMC and checks both the conditions of decision block 504. If both the two conditions are true, the IaaS layer initiates a request to the HMC to deallocate resources for a VF as indicated in a block 506. As indicated in a block 508, the HMC triggers a request to the hypervisor to deallocate idle resources and add the resources to the adapter allocated unused resources pool.

Figure 6:
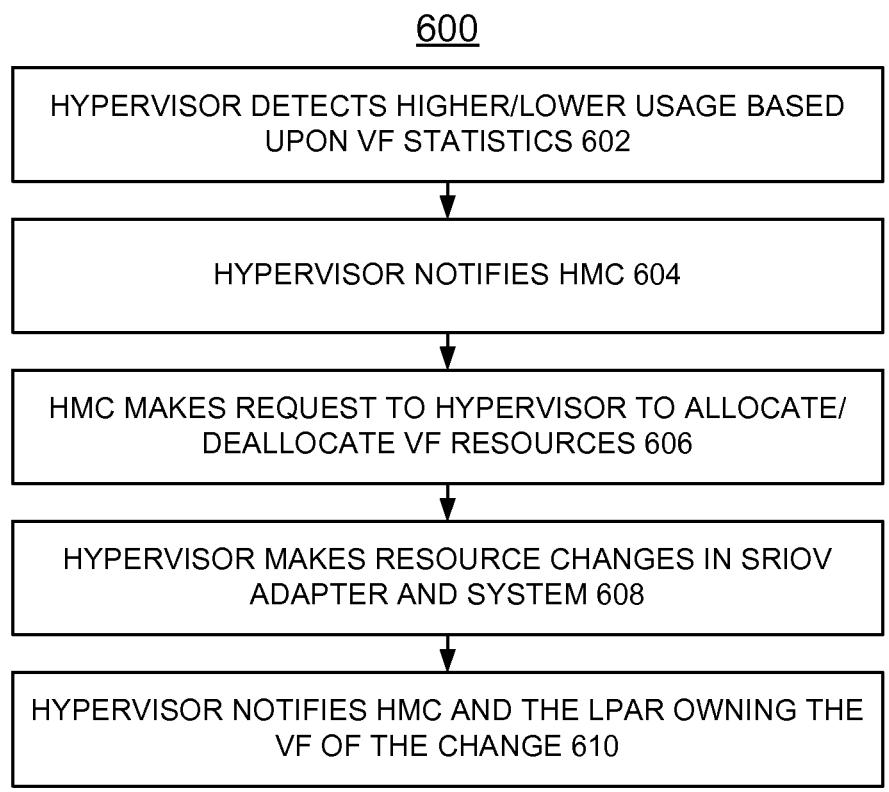

Referring now to FIG. 6, there are shown example steps generally designated by the reference character 600 for detecting usage of resources and adjusting resource allocations for a SRIOV RMDA VF. As indicated in a block 602, the hypervisor detects higher or lower usage based upon VS statistics. The hypervisor notifies the HMC as indicated in a block 604. The HMC makes request to hypervisor to allocate or deallocate VF resources as indicated in a block 606. The hypervisor makes resource changes in the SRIOV adapter and system as indicated in a block 608. Then the hypervisor notifies the HMC and the LPAR owning the VF of the change as indicated in a block 610.

Referring to FIG. 7, there is shown an example bitmap generally designated by the reference character 700 for tracking resource usage in accordance with the preferred embodiment. For example, the bitmap 700 is maintained having a capacity that is equal to a number of resources allocated to a particular VF. For example, as shown, a particular bit is set or one in the bitmap 700 indicates that the resource corresponding to that bit is used or otherwise is zero indicating an unused resource.

Referring now to FIG. 8, an article of manufacture or a computer program product 800 of the invention is illustrated. The computer program product 800 is tangibly embodied on a non-transitory computer readable storage medium that includes a recording medium 802, such as, a floppy disk, a high capacity read only memory in the form of an optically read compact disk or CD-ROM, a tape, or another similar computer program product. Recording medium 802 stores program means 804, 806, 808, and 810 on the medium 802 for carrying out the methods in the system 100 of FIG. 1 for implementing dynamic adjustment of resources allocated to Single Root Input/Output Virtualization (SRIOV) Remote Direct Memory Access (RMDA) virtual functions (VFs) in Cloud Software Defined Server environments in accordance with the preferred embodiment.

A sequence of program instructions or a logical assembly of one or more interrelated modules defined by the recorded program means 804, 806, 808, and 810, direct the computer system 800 for implementing dynamic adjustment of resources allocated to SRIOV RMDA virtual functions (VFs) of a preferred embodiment.

While the present invention has been described with reference to the details of the embodiments of the invention shown in the drawing, these details are not intended to limit the scope of the invention as claimed in the appended claims.

What is claimed is:

1. A method for implementing dynamic adjustment of resources allocated to Single Root Input/Output Virtualization (SRIOV) Remote Direct Memory Access (RMDA) virtual functions (VFs) in Cloud Software Defined Server environments comprising:

using a hardware management console (HMC) and a hypervisor to implement resource allocation said hypervisor, checking resource usage for the resource allocations of a Single Root Input/Output Virtualization (SRIOV) Remote Direct Memory Access (RMDA) VF relative to lower and upper threshold values;

responsive to identifying the resource usage below the lower threshold or above the upper threshold for the RMDA VF, said hypervisor sending an event to the HMC, said HMC starting a resource redistribution process including said HMC querying usage statistics from said hypervisor, responsive to receiving said event; for each active VF, allocating based on priority from an adapter unallocated resource pool, and when needed, allocating based on priority from an adapter allocated resource pool, updating resources used attribute for the RMDA VF, and sending updated limits to said hypervisor;

said HMC responsive to usage statistics from said hypervisor, making request to said hypervisor to allocate and deallocate VF resources; and said hypervisor, making resource changes in the SRIOV RDMA adapter and system, and notifying said HMC, and a logical partition (LPAR) owning the SRIOV RMDA VF of the change.

2. The method as recited in claim 1, includes said HMC allocating additional resources from free resources to a particular VF requiring more resources.

3. The method as recited in claim 1, includes said hypervisor collecting VF statistics and determining a VF having more traffic based on the collected VF statistics; and said hypervisor notifying said HMC.

4. The method as recited in claim 3, includes said hypervisor dynamically allocating and deallocating resources to and from a VF.

5. The method as recited in claim 1, includes said HMC deallocating excess resources from a VF and returning the excess resources to free resource pool responsive to resources used by a particular VF being lower than a predefined threshold.

6. The method as recited in claim 1, includes said hypervisor maintaining usage of resources by a Virtual Function (VF) using a Bitmap.

7. The method as recited in claim 1, includes said hypervisor using a plurality of resource pools for maintaining usage of resources.

8. The method as recited in claim 1, includes said hypervisor maintaining usage of resources using an adapter allocated used resource pool of resources allocated and actively being used by VFs; an adapter allocated unused resource pool of resources allocated and not being used by VFs; and an adapter unallocated resource pool of all unallocated resources.

9. The method as recited in claim 1, includes said HMC responsive to a reallocation resource request, allocating resources for each active VF starting with a highest priority VF.

10. The method as recited in claim 1, includes providing an intelligent software provisioning layer monitoring events from said hypervisor; said intelligent software provisioning layer dynamically reducing unused resources for the VFs based on thresholds and idle periods for resources of a predefined amount of time for which there is no activity.

11. A system for implementing dynamic adjustment of resources allocated to Single Root Input/Output Virtualization (SRIOV) Remote Direct Memory Access (RMDA) virtual functions (VFs) in Cloud Software Defined Server environments comprising:
 a Single Root Input/Output Virtualization (SRIOV) Remote Direct Memory Access (RMDA) adapter comprising a plurality of virtual functions (VFs),
 a hardware management console (HMC) and a hypervisor;
 a processor using said hardware management console (HMC) and said hypervisor to implement resource allocation;
 said hypervisor, checking resource usage for the resource allocations of a SRIOV Remote Direct Memory Access (RMDA) VF relative to lower and upper threshold values;
 responsive to identifying the resource usage below the lower threshold or above the upper threshold, said hypervisor sending an event to the HMC,
 said HMC starting a resource redistribution process including said HMC querying usage statistics from said hypervisor, responsive to receiving said event; for each active VF, allocating based on priority from an adapter unallocated resource pool, and when needed, allocating based on priority from an adapter allocated resource pool, updating resources used attribute for the RMDA VF, and sending updated limits to said hypervisor;
 said HMC responsive to usage statistics from said hypervisor, making a request to said hypervisor to allocate and deallocate VF resources; and
 said hypervisor, making resource changes in the SRIOV RDMA adapter and system, and notifying said HMC, and a logical partition (LPAR) owning the SRIOV RMDA VF of the change.

12. The system as recited in claim 11, wherein said management function and said hypervisor include control code tangibly embodied in a non-transitory machine readable medium used for implementing dynamic resource allocation.

13. The system as recited in claim 11, includes said HMC allocating additional resources from free resources to a particular VF requiring more resources.

14. The system as recited in claim 11, includes said HMC deallocating additional resources from a particular VF to free resources.

15. The system as recited in claim 11, includes said hypervisor dynamically allocating and deallocating resources to and from a VF.

16. The system as recited in claim 11, includes said HMC responsive to a reallocation resource request, allocating resources for each active VF starting with a highest priority VF.

17. The system as recited in claim 11, includes said hypervisor maintaining usage of resources by a Virtual Function (VF) using a Bitmap.

18. The system as recited in claim 11, includes said hypervisor maintaining usage of resources using an adapter allocated used resource pool of resources allocated and actively being used by VFs; an adapter allocated unused resource pool of resources allocated and not being used by VFs; and an adapter unallocated resource pool of all unallocated resources.

19. The system as recited in claim 11, includes providing an intelligent software provisioning layer monitoring events from said hypervisor; said intelligent software provisioning layer sending requests to said HMC for dynamically reducing unused resources for the VFs based on thresholds and idle periods for resources of a predefined amount of time for which there is no activity.

20. The system as recited in claim 11, includes said hypervisor collecting VF statistics and determining a VF having more traffic based on the collected VF statistics; and said hypervisor notifying said HMC.

* * * * *